ABSTRACT OF THE DISCLOSURE

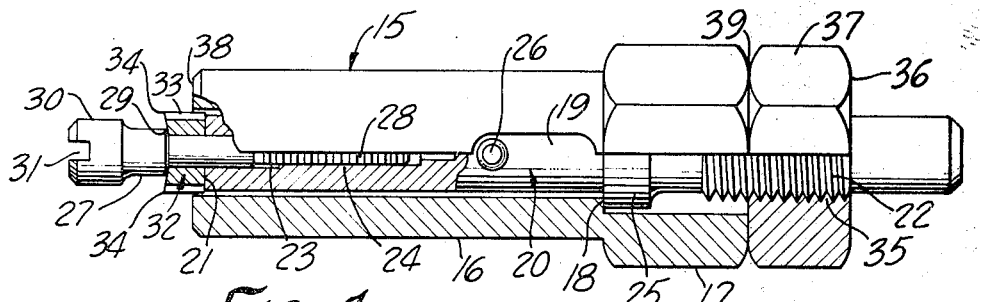
FIG. 1.
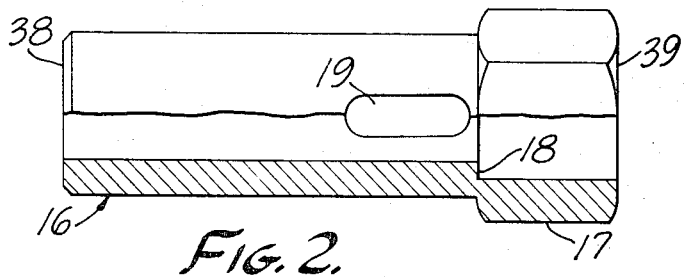
FIG. 2.
FIG. 3.
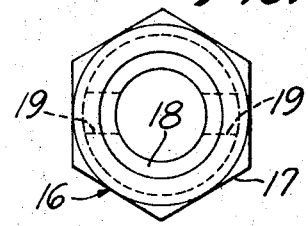
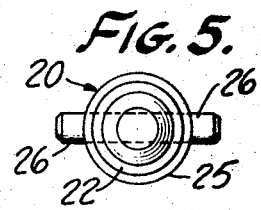
FIG. 4
FIG. 5.
FIG. 7.
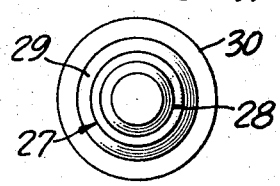
FIG. 6.
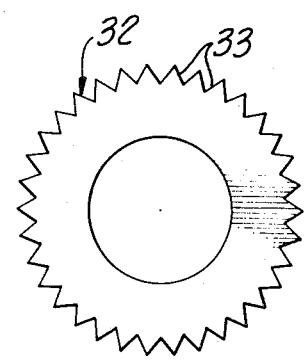
FIG. 8.   FIG. 9.   FIG. 10.   FIG. 11.
INVENTORS
JOSÉ ROSÁN, SR.
BY MARVIN P. REECE
ATTORNEY 3,540,101
BROACHING TOOL
Jose Rosan, Sr., Rancho San Juan, San Juan Capistrano,
Calif. 92675, and Marvin P. Reece, 33262 Bremerton
Ave., Dana Point, Calif. 92629
Filed Mar. 21, 1969, Ser. No. 809,115
Int. Cl. B23p 15/42; B26d 1/04
U.S. Cl. 29—95.1                                10 Claims

A semiautomatic broaching tool for broaching counterbore serrations to a predetermined depth which is provided with a means for disengaging the broaching tool from the workpiece material after completion of the broaching action.

---

The increased use of fasteners and inserts having externally serrated swageable heads or collars which are embedded in a bore in a workpiece so as to lock the same therein against rotational displacement has created a problem where the workpiece material is relatively harder than the material composing the insert or fastener. That is, where the insert material is softer than that of the workpiece, the head serrations thereof cannot be embedded in the workpiece bore since the serrations will become deformed without penetrating the workpiece material. Where the workpiece is harder than the insert or fastener, by prebroaching the workpiece bore so as to provide serrations about the internal periphery thereof, the head of the insert or fastener which is outwardly expanded or swaged may then be compressed against the serrations in the workpiece bore, thereby interposing the insert or fastener material between the serration crests so as to prevent subsquent rotational movement of the fastener relative to the workpiece bore.

The broaching tool of the instant invention for serrating a bore of a workpiece, as hereinabove described, is provided with a pilot guide for positioning the tool in concentric axial alignment with said workpiece bore. The broaching cutter is downwardly displaced to a predetermined depth in the workpiece bore by a mandril which is secured to the pilot guide. Thereafter, by rotation of a member in helical threaded engagement with the mandril, said member being prohibited from downward helical displacement, the mandril, and concomitantly the pilot guide are linearly axially displaced.

The pilot guide, upon its linear displacement, will engage the broaching cutter and slightly retract the cutter from the broached serrations in the workpiece bore thereby overcoming the "freeze" of the cutter with the workpiece bore. The broaching tool is thereafter easily removed from the workpiece bore for subsequent usage.

Accordingly, the principal object of the invention is to provide a simple semiautomatic broaching tool which is easily disengaged from the broached workpiece bore after the broaching operation.

Another object is to provide a simple broaching semiautomatic tool which is capable of consistently concentrically and axially broaching workpiece bores.

Still another object is to provide a simple semiautomatic broaching tool capable of broaching workpiece bores to uniform predetermined depths.

Other objects and advantages will be readily apparent from the following description taken in conjunction with the accompanying drawings, in which:

FIG. 1 is an elevational view, partly sectioned, of the semiautomatic broaching tool of the invention;

FIG. 2 is an elevational view, partly sectioned, of the body of the tool shown in FIG. 1;

FIG. 3 is a top plan view of the body illustrated in FIG. 2;

FIG. 4 is an elevational view, partly sectioned, of the mandril of the tool shown in FIG. 1;

FIG. 5 is a top plan view of the mandril illustrated in FIG. 4;

FIG. 6 is an elevational view of the pilot guide of the tool shown in FIG. 1;

FIG. 7 is a top plan view of the pilot guide illustrated in FIG. 6;

FIG. 8 is a sectioned view of the broach cutter of the tool shown in FIG. 1;

FIG. 9 is a top plan view of the broach cutter illustrated in FIG. 8;

FIG. 10 is an elevational view, partly sectioned, of the removal nut element of the tool shown in FIG. 1; and FIG. 11 is a top plan view of the removal nut element illustrated in FIG. 10.

Referring more particularly to FIGS. 1–11, reference numeral 15 designates generally the semiautomatic broaching tool of the invention which is provided with a hollow outer body 16 having wrench engaging means 17 and an internal abutment shoulder 18. (See FIGS. 1, 2 and 3.) Elongated slots 19, for purposes to be hereinafter more fully explained, carried by body 16 interconnect the hollow of said body.

Positioned within the hollow of body 16, in slidable engagement therewith, is mandril 20. (See FIGS. 1, 4 and 5.) Mandril 20 is provided with an abutment end 21, an external thread 22 and a hollow internal cavity 23 having a threaded portion 24. Radially and outwardly extending from said mandril is an annular flange 25 which is adapted to engage and abut against the internal abutment shoulder 18 of body 16. Outwardly extending from mandril 20 are limiting guide means 26 which are in slidable engagement with elongated slots 19 provided by body 16 so as to prohibit rotational movement of mandril 20 relative to body 16, yet permitting said mandril longitudinal movement relative to the body. Although guide means 26 are illustrated as a pin passing transversely through mandril 20, it is understood that one or more outwardly extending projections of any configuration may be utilized without deviating from the scope of the invention herein.

Pilot guide 27 (see FIGS. 1, 6 and 7) is threadedly engaged with mandril 20 by external threads 28 and internal threads 24, respectively. A radially extending abutment shoulder 29 engageable with the broaching cutter, as will hereinafter be more fully described, is provided by pilot guide 27. Pilot guide 27 has also an enlarged portion 30 which has a diameter that is slightly less than that of the workpiece bore in which it is inserted so that the tool, and concomitantly the broaching cutter, is properly aligned relative to the threaded workpiece bore.

To simplify the removal of pilot guide 27 from threaded engagement with mandril 20, said pilot guide is provided with a slot means 31 for engagement by a screwdriver or the like. Thus, the pilot guide may be easily interchanged with pilot guides of other sizes.

Broaching cutter 32 has an axial bore passing therethrough and is concentrically positioned about the shank of pilot guide 27 so as to be situated between shoulder 29 of said pilot guide and abutment end 21 of mandril 20. Positioned about the outer periphery of broaching cutter 32 is a plurality of longitudinal serrations 33 having the lead portions thereof longitudinally extended to form broaching teeth 34. (See FIGS. 1, 8 and 9.) The number of serrations positioned thereabout may be varied to suit the design requirements of the used without deviating from the scope of the invention disclosed herein.

Threadedly engaged with threads 22 of mandril 20 by means of internal threads 35 is removal nut element 36 which is provided with wrench engagement means 37. (See FIGS. 1, 10 and 11.)

The semiautomatic broaching tool of the instant invention functions as follows:

Pilot guide 27 is inserted into a bore in a workpiece so as to position broaching tool 15 in axial alignment with said bore. It should be noted that the diameter of the enlarged portion 30 of the pilot guide 27 is slightly less than that of the bore so that longitudinal movement of pilot guide 27 is permitted therein. The forward end 38 of body 16 is placed flush upon the workpiece surface adjacent the bore therein. An axial force is applied to the end of the body portion of mandril 20 which is provided with threads 22 thereby causing said mandril to be axially downwardly displaced. The amount of the downward displacement of mandril 20 and concomitantly broaching cutter 32, is limited to a predetermined depth by the engagement of annular flange 25 of mandril 20 with abutment shoulder 18 of body 16.

This action causes abutment end 21 of mandril 20 to contact broaching cutter 32 and simultaneously downwardly displace the same into the workpiece material adjacent the edge of the bore so as to cause broaching teeth 34 thereof to cut longitudinal serrations about the internal periphery of the bore. Broaching cutter 32 is slidably mounted about the shaft of pilot guide 27 and has an internal diameter less than that of said shank of pilot guide 27 thereby being capable of relatively free longitudinal movement.

After the broaching operation is completed, removal nut element 36 is rotated clockwise about the threaded portion 22 of mandril 20 and thereby downwardly helically displaced until prohibited from further downward displacement by engagement thereof with the upper end 39 of body 16. Upon continued rotation of nut element 36, mandril 20, due to the interengagement of limiting guide means 26 carried thereby with the elongated slots 19 provided by body 16, is prohibited from rotational movement so that said mandril will of necessity be linearly outwardly displaced rather than rotationally displaced. The requirement for a linear rather than a rotational displacement is important as will hereinafter be more fully described.

The outward displacement of mandril 20 will concomitantly outwardly displace pilot guide 27 due to the threaded engagement thereof. When pilot 27 is outwardly displaced to a point where abutment shoulder 29 thereof engages the forward face of broaching cutter 32, the latter will also be outwardly displaced thereby eliminating the "freeze" between the cutter and the workpiece material inherent in this type of operation. The requirement for a linear rather than a rotational outward displacement of mandril 20 becomes more obvious, since the simultaneous outward displacement of the cutter 32 must also be linear due to the ultimate position of the cutter serrations 33 relative to the broached workpiece material interposed therebetween subsequent to the broaching operation.

Once the broach-workpiece "freeze" is overcome, the broaching tool is easily removed from the workpiece bore, ready for subsequent reuse.

While one embodiment of the invention has been described, it is understood that the particular embodiment of the invention herein disclosed is for illustrative purposes only.

We claim:

1. A semiautomatic broaching tool, comprising:
   a hollow body, said body being provided with slot means and with internal shoulder means;
   an elongated mandrill positioned within said body and in slidable relationship therewith, said mandril having an outwardly extending flange for abutting engagement with the internal shoulder of said body and a portion of said mandril having external threads, said mandril having an internal bore, at least a portion thereof being threaded, said mandril being provided with outwardly extending limiting means for preventing rotational movement but permitting longitudinal movement of said mandril, said limiting means being in slidable engagement with the slot means of said body;
   removable pilot guide means concentrically engaged with said mandril, said pilot guide means being provided with external shoulder means;
   a broaching cutter provided with an axial bore passing therethrough positioned about said pilot guide means and in slidable relationship therewith, said broaching cutter being situated between the external shoulder means of the pilot guide means and the forward end of the mandril, said cutter having a plurality of broaching teeth positioned about the periphery thereof; and
   cutter removal means provided with internal threads, said removal means being in threaded engagement with the external threads of said body.

2. A semiautomatic broaching tool as described in claim 1, wherein the longitudinal distance between the upper face of the internal shoulder carried by the body and the forward end of said body is greater than the longitudinal distance between the underside of the outwardly extending flange of the mandril and the forward end of said mandril.

3. A semiautomatic broaching tool as described in claim 2, wherein the internal shoulder provided by the body and the outwardly extending flange carried by the mandril are annular.

4. A semiautomatic broaching tool as described in claim 3, wherein the minimum diameter of the flange carried by the mandril is greater than the minimum diameter of the internal shoulder provided by the body.

5. A semiautomatic broaching tool as described in claim 4, wherein the mandril is provided with an impact receiving end opposite the forward end thereof.

6. A semiautomatic broaching tool as described in claim 1, wherein said limiting means are comprised of laterally protruding pins accommodated in the slot means of the body and wherein said slot means are elongated in a longitudinal direction.

7. A semiautomatic broaching tool as described in claim 1, wherein said removable pilot guide means is provided with a threaded end for threaded engagement with the threads of the internal bore of the mandril and the opposite end of said pilot guide has a slot therein for engagement with a cooperative removal tool.

8. A semiautomatic broaching tool as described in claim 1, wherein the maximum longitudinal height between the faces of the broaching cutter is less than the minimum distance between the external shoulder means of the pilot guide means and the forward end of the mandril, and the maximum bore diameter of said broaching cutter is less than the minimum diameter of the external shoulder means of the pilot guide means.

9. A semiautomatic broaching tool as described in claim 8, wherein the broaching cutter is concentrically positioned about the pilot guide means and the broaching teeth are comprised of longitudinally extending serrations having the forward ends thereof slightly extended beyond the forward faces of the broaching cutter.

10. A semiautomatic broaching tool as described in claim 1, wherein the cutter removal means is a nut provided with external wrench engaging means.

References Cited

UNITED STATES PATENTS

| | | | |
|---|---|---|---|
| 3,271,841 | 9/1966 | Rohe et al. | 29—95.1 |
| 2,943,383 | 7/1960 | Anthony et al. | 29—95.1 |
| 2,283,222 | 5/1942 | Miller et al. | 29—95.1 X |
| 1,547,944 | 7/1925 | Murphree | 29—95.1 X |
| 1,359,541 | 11/1920 | Smith | 29—95.1 |
| 1,328,085 | 1/1920 | Hollander | 29—95.1 |

HARRISON L. HINSON, Primary Examiner